Oct. 13, 1936.  O. S. RUUD  2,057,317

DRIVING MECHANISM FOR WINDSHIELD WIPERS

Filed April 7, 1934  2 Sheets-Sheet 1

Inventor.
Otto Severin Ruud.
By Watson E. Coleman
attorney.

Oct. 13, 1936.  O. S. RUUD  2,057,317
DRIVING MECHANISM FOR WINDSHIELD WIPERS
Filed April 7, 1934   2 Sheets-Sheet 2
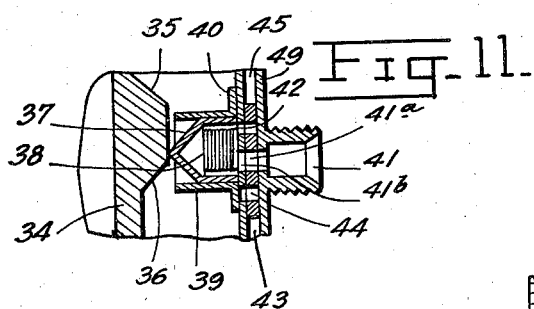
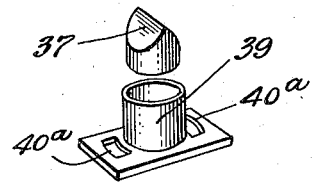
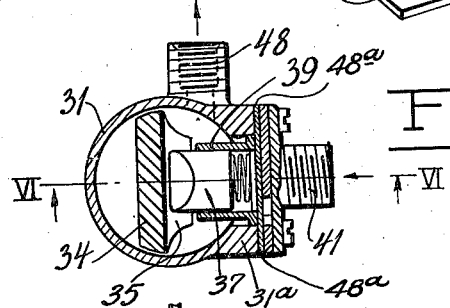
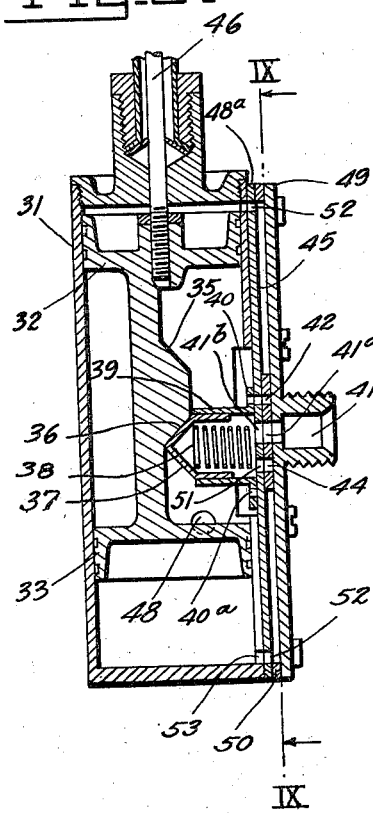
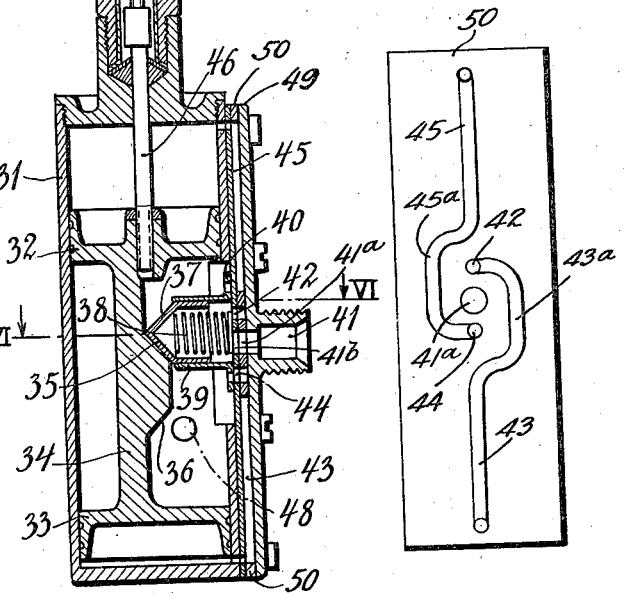
Inventor
Otto Severing Ruud
By Watson E. Coleman
Attorney Patented Oct. 13, 1936

2,057,317

UNITED STATES PATENT OFFICE 2,057,317

DRIVING MECHANISM FOR WINDSHIELD WIPERS

Otto Severin Ruud, Oslo, Norway

Application April 7, 1934, Serial No. 719,577
In Great Britain April 13, 1933

5 Claims. (Cl. 121—97)

The present invention relates to a driving mechanism for windshield wipers of automobiles and is characterized by the wiper being moved by means of a pressure fluid, for example, the circulating oil of the pressure lubricating system. The purposes of the invention are to obtain a safe driving operation and in all circumstances to secure the necessary pressure of the oil by means of which the device is driven.

The invention is illustrated by way of example in the accompanying drawings in which:

Figure 6 is a section on the line 6—6 of Figure 7.

Figure 7 is a longitudinal vertical section on line 7—7 of Figure 6 of a reciprocating motor with a spring actuated slide valve applied thereto.

Figure 8 is a like view to Figure 7 but showing the piston reversed.

Figure 9 is a section on the line 9—9 of Figure 8 and showing the ports in the side wall of the cylinder.

Figure 10 is a perspective view of the slide valve with cap separated from the body thereof.

Figure 11 is a section in the same plane as Figures 7 and 8 but showing the position of the slide valve just before its shift.

Figure 1:
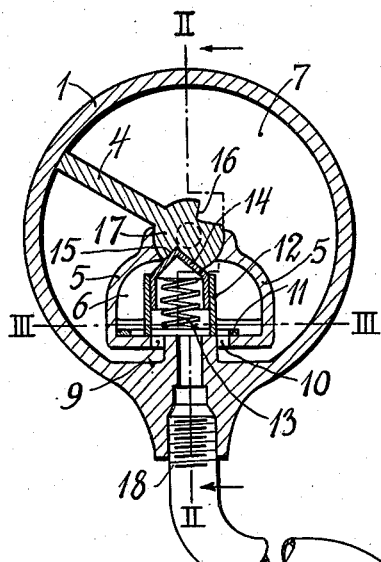
Fig. 1 is a sectional view upon the line I—I, Fig. 2, of a casing containing driving mechanism for the wiper (not shown), the figure also showing in longitudinal section a coupling member whereby the motor is connected to the lubricating supply pipe of an automobile.
Figure 2:
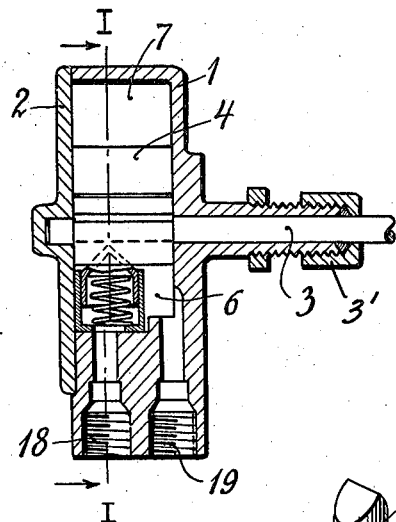
Fig. 2 is a sectional view on the line II—II, Fig. 1.
Figure 3:
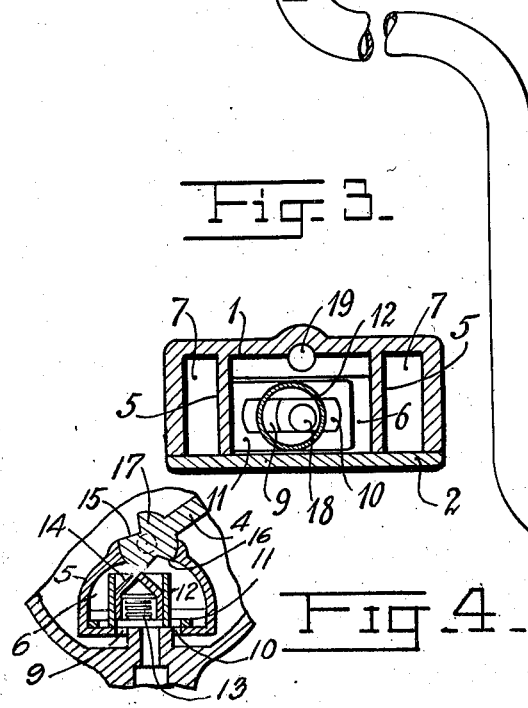
Fig. 3 is a sectional view on the line III—III, Fig. 1.
Figure 5:
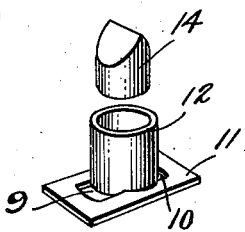
Figure 5 is a perspective view of the slide valve with the hollow actuating cap therefor separated from the body of the valve.

As shown in Figures 1 to 5, the mechanism is arranged inside a cylindrical casing comprising a hollow element or housing 1 having a cover plate 2. The wiper, not shown, is connected with a shaft 3 passing through a gland 3' in one wall of the casing and the shaft is rigid with an oscillating vane piston 4 inside said casing.

The part 1 is provided with two symmetrically located interior walls 5, 5 which divide the casing into two chambers 6 and 7 communicating with each other through openings 9, 10, in the flat base 5' of the chamber 6, chamber 6 being a valve chamber and chamber 7 a working chamber for the piston 4.

In the chamber 6 is arranged a slide valve 11 carrying a hollow cylindrical part 12 extending outward at right angles to the face of the slide valve in which is placed a hollow cap which constitutes a tooth 14 having a pointed or wedge shaped end, said tooth being urged outwardly with respect to the cylinder 12 by a spring 13 and being guided in the cylinder 12. The pointed end of the body 14 engages alternately in recesses 15 and 16 in the hub 17 of the piston 4. 18 designates the oil inlet which in all positions of the slide 11 opens inside the cylinder 12 of the slide valve, and 19 designates the oil outlet which is connected to the chamber 6 outside the cylinder 12.

In connection with the motor above described, I use a coupling 20 to the oil pump such as shown in section in Figure 1. In this figure, 21 designates the inlet from the oil pump into this coupling and 21a the outlet from which a pipe leads to the inlet opening 18 of the motor. At the end of the channel 21 is placed a spring actuated ball valve 22 on the opposite side of which is placed the outlet 23 to the several parts which are to be lubricated.

The device shown in Figures 1 to 5 acts as follows:

When the oil pump is working some oil passes through the valve 22 to the lubricating points of the plant, and at the same time oil passes through the outlet 21 to the wiper driving device. As the oil passing through the outlet 23 is braked by the valve 22, the current of oil through the outlet 21a will be secured under all circumstances without regard to the varying oil-consumption in the parts of the machinery which are being lubricated.

As shown in Figure 1, the oil passes into the motor through the channel 18, into the interior of the cylinder 12 of the slide valve and through the port 9 into chamber 7 in which it acts on the piston 4 and drives same in clockwise direction.

Figure 4:
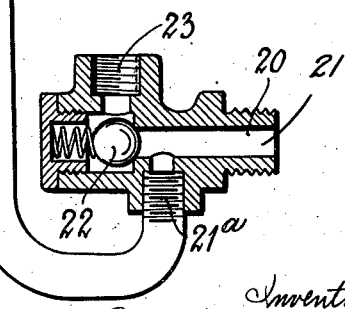
Figure 4 is a fragmentary section on the same plane as Figure 1 but showing the piston as it nears the end of its right hand stroke and just before the slide valve is shifted.

As the outer end of the piston moves in a clockwise direction, the hub portion 17 of the piston forces the body 14 downwardly out of the recess 15 as shown in Figure 4 and, after a certain motion of the piston, it will be forced into the recess 16, slide 11 being simultaneously forced to the right by the wedging action of the wedge-shaped body 14 acting against one face of the recess 16. Thus that portion of the chamber 7 on the right hand side of the piston which communicated previously through the port 10 and the outlet 19 is connected with the inlet 18, the space on the opposite side of the piston 4 being put into connection with the outlet 19. The oil leaving through this outlet 19 is returned to an oil receiver (not shown) through a suitable pipe connection. The piston 4 will, therefore, be driven back to the initial position shown in the drawings. As the recess 15 in the hub again approaches said initial position of the body 14 will return the slide valve 11 to the position shown for causing the piston 4 again to be driven in a clockwise direction.

In Figs. 6 to 11 31 designates the cylinder of a reciprocating motor, 32 and 33 designate a double ended or twin piston connected by means of a rigid bar 34 having inclined faces 35, 36 adapted to coact with a hollow wedge-shaped cap 37 enclosing a spring 38 which forces the cap toward the bar 34, the cap fitting in a cylinder 39 rigidly secured to or formed as part of the slide valve 40. This slide valve 40 has two ports 40ª, as shown in Figure 10.

When the cap 37 reaches an inclined face 35 or 36 of the bar 34, the cap will be depressed and will be suddenly projected when reaching the opposite inclined face of the enlargement wedging the slide valve over and changing the path of the pressure fluid so as to cause the piston to be moved in the opposite direction.

One side wall of the cylinder 31, as shown in Figures 6, 7 and 8 is extended outward at 31ª and disposed against this side wall is a plate 48ª. Disposed parallel to the plate 48ª is a plate 49 which carries the inlet nipple 41. Disposed between the plates 48ª and 49 is a plate 50, as shown in Figure 9, cut out to provide a central opening 41ª, the ports 42 and 44 and the by-pass passages 43 and 43ª and 45 and 45ª. The ports 42 and 44 are disposed on diametrically opposite sides of the central opening 41ª. From the port 42 the by-pass passages 43ª and 43 extend toward the lower end of the plate 50, as shown in Figure 9, while from the port 44 the by-pass passages 45ª and 45 extend in the opposite direction. The plate 48ª is provided with a central port 41ᵇ and with ports 51 which register with the ports 42 and 44 of plate 50, and this plate 48ª is also provided at its ends with ports 52 which register with ports 53 formed in the opposite ends of the cylinder wall 31ª.

In the operation of this form of my motor, the pressure fluid enters through the opening 41 in Figure 7 and passing through the ports 41ª and 41ᵇ enters the interior of the slide valve cylinder 39. The piston, as shown in Figure 7, is at the downward end of its travel. As a consequence, one of the ports 40ª is in register with the port 44 while the other port 40ª of the slide valve is out of register with the port 42. The slide valve 40 acts like an ordinary D-valve. The port 42 is uncovered and opens into the interior of the slide valve so that pressure fluid passes from the interior of the valve cylinder 39, then by way of the by-pass 43ª and 43 to the lower end of the cylinder 31 and causes the piston to move upward. The upward movement of the piston has no effect upon the slide valve which has moved upward as far as it can in Figure 7, but as the piston moves upward the inclined face 35 forces the cap 37 outward against the action of the spring 38. The apex of this cap travels along the flat surface between the inclined portions 35 and 36, as shown in Figure 11, but as soon as the apex of the cap 37 is passed on to the inclined face 36, the spring forces the cap toward the bar 34 and this suddenly wedges the slide valve downward to the position shown in Figure 8. The inlet opening 41 is connected through ports 41ª and 41ᵇ to the port 44. As the piston is moving upward in Figure 7, the fluid above the piston is forced out into the by-pass 45ª and out through the port 44 and the lower port 40ª of the slide valve into the interior of the cylinder and passes out through the exhaust port 48.

When the slide valve has sprung to the position shown in Figure 8, it connects the inlet port 41 with the port 44 so that fluid pressure now passes upward along the by-pass 45ª and 45 to the upper end of the cylinder, causing the downward travel of the piston, the pressure fluid on the underside of the piston passing out through the ports 53 and 52 into the passages 43—43ª and thus to the port 42 and out through the uppermost port 40ª into the interior of the cylinder and out through the port 48. Thus a continuous reciprocation will be given to the piston 32—33 and this reciprocation of the piston will be transmitted by suitable means to the wiper.

Preferably, as is shown in Figure 7, the piston is fastened to a rod 46 which is connected in turn to a Bowden wire or other flexible pull and push wire 47 by means of which a controlled motion of the opposite end of the wire in both directions is secured.

The outlet of the pressure fluid is designated 48 from which the fluid passes through a suitable pipe to a receiver (not shown).

Any suitable means, such as a clamping screw or a clip may be employed for fixing the device on or adjacent the screen or window to be kept clean.

I claim:—

1. A fluid operated motor including an outer casing having an outlet port and an inlet port, a piston operating within the casing, a slide valve within the casing and having a middle port and two lateral ports, the slide valve being shiftable to direct fluid from the inlet port of the casing to one side or the other of the piston alternately and simultaneously connect the space on the other side of the piston with the casing outlet port, and means for shifting the valve from one position to the other, including a wedge-shaped member carried by the valve and extending at right angles thereto, a spring resiliently urging the member toward the piston, the piston having opposed inclined faces with which the opposite faces of the wedge-shaped member alternately engage to thereby alternately depress the wedge-shaped member against the tension of the spring and then permit the spring to move it outward and have wedging engagement with the opposite inclined face of the piston to thus wedge the valve over towards its other position.

2. A fluid motor including a casing having an inlet and an outlet, a piston operating in the casing, a slide valve having ports for admitting fluid to the casing through the inlet and for securing passage of the fluid to the outlet, the slide valve being shiftable to direct the fluid to one or the other side of the piston alternately and connect the space on the other side of the piston to the outlet of the casing, a cylinder carried by the valve, a wedge-shaped element disposed in one end of the cylinder, a spring urging the wedge-shaped element toward the pivotal end of the piston, the piston having oppositely inclined faces with which the wedge-shaped element alternately engages to compress the spring, the successive engagement of the wedge-shaped element with the other of said faces releasing the wedge-shaped element which then acts under the impulse of the spring to shift the slide valve from one position to the other.

3. In a fluid pressure operated motor, a casing having an inlet and an outlet, a piston pivotally mounted within the casing for oscillation therein, a slide valve having ports for admitting fluid to the casing and for permitting the fluid to flow to the outlet port of the casing, the slide valve being shiftable to direct the fluid to one side of the piston or to the other alternately and simultaneously connect the space on the other side of the piston with the outlet port of the casing, a wedge-shaped element supported by the slide valve, a spring urging the element toward the piston, the hub portion of the piston having opposed oppositely inclined faces with which the wedge-shaped element alternately engages, the inclined faces of the piston alternately depressing the wedge-shaped element against the action of the spring and successively releasing the wedge-shaped element to thereby cause it to wedge against an inclined face on the piston and cause the slide valve to shift from one position to the other.

4. In a fluid operated motor, a casing having an inlet port, and a chamber within the casing into which the inlet port opens, the casing having an outlet port, a piston pivoted within the casing and having its pivotal end extending into said chamber, the chamber having ports on each side of the inlet opening adapted to admit fluid from the chamber into the casing on opposite sides of the piston, a slide valve disposed within said chamber and having a middle inlet port and lateral ports coacting with the ports in the chamber on each side of the inlet opening and adapted when shifted in one direction to connect the inlet port with one of the lateral ports in the chamber and when shifted in the other direction to connect the other lateral port of the chamber with the interior of the casing on the other side of the piston, a wedge-shaped element carried by the slide valve, a spring urging the wedge-shaped element toward the pivotal end of the piston, the pivotal end of the piston having opposed shoulders adapted as the piston oscillates to engage said wedge-shaped element and depress it against the action of the spring, the wedge-shaped element when released by passing off of the other shoulder wedging the slide valve laterally to open one or the other of the lateral ports leading from the chamber.

5. A fluid pressure motor including a cylindrical casing having a medially disposed inlet port, a double piston reciprocating within the cylinder and including a piston body connecting the double pistons, the body being formed with opposed oppositely inclined contact faces, a slide valve disposed within the casing and between the double pistons, the wall of the casing over which the slide valve operates having passages opening at their outer ends to opposite ends of the casing and terminating at their inner ends in ports opening to the interior of the casing, the slide valve having a central port and two lateral ports, the slide valve having a cylindrical member extending at right angles thereto, and a wedge-shaped element disposed in the cylindrical member, a spring urging the element toward the piston body, one inclined face of the piston body acting when brought in contact with the wedge-shaped member to depress the wedge-shaped member against the action of the spring, the release of the wedge-shaped member when it reaches the other inclined face of the body acting to wedge the slide valve in one direction, the slide valve being thus alternately shifted in one direction or the other to alternately connect one or the other end of the cylindrical casing with the inlet port and to connect the other end of the casing with the space between the double pistons, the casing having an outlet port disposed between said pistons.

OTTO SEVERIN RUUD.